US011467255B2

(12) United States Patent
Esfahany et al.

(10) Patent No.: US 11,467,255 B2
(45) Date of Patent: Oct. 11, 2022

(54) LIDAR SYSTEM FOR OBJECT DETECTION AND RECOGNITION

(71) Applicant: ALBERTA CENTRE FOR ADVANCED MNT PRODUCTS, Edmonton (CA)

(72) Inventors: Siamak Akhlaghi Esfahany, Edmonton (CA); Viet Hoang, Edmonton (CA); Ilya Utkin, Edmonton (CA); Murray Paulson, Edmonton (CA); Ken Brizel, Edmonton (CA)

( * ) Notice: Subject to any disclaimer, the term of this patent is extended or adjusted under 35 U.S.C. 154(b) by 940 days.

(21) Appl. No.: 16/243,652

(22) Filed: Jan. 9, 2019

(65) Prior Publication Data

US 2019/0212414 A1 Jul. 11, 2019

Related U.S. Application Data

(60) Provisional application No. 62/615,338, filed on Jan. 9, 2018.

(51) Int. Cl.
| | |
|---|---|
| *G01S 7/48* | (2006.01) |
| *G01S 7/481* | (2006.01) |
| *G01S 17/46* | (2006.01) |
| *G01B 11/25* | (2006.01) |
| *G01S 17/931* | (2020.01) |

(52) U.S. Cl.
CPC ............ *G01S 7/4802* (2013.01); *G01B 11/25* (2013.01); *G01S 7/4808* (2013.01); *G01S 7/4814* (2013.01); *G01S 17/46* (2013.01); *G01S 17/931* (2020.01)

(58) Field of Classification Search
CPC .... G01S 7/4802; G01S 7/4808; G01S 7/4814; G01S 17/46; G01S 17/931; G01B 11/25
USPC ........................................................ 356/5.01
See application file for complete search history.

(56) References Cited

U.S. PATENT DOCUMENTS

| | | | |
|---|---|---|---|
| 6,618,155 B2 * | 9/2003 | Metcalfe ............ | G01N 21/8986 356/625 |
| 6,856,448 B2 | 2/2005 | Fitzpatrick et al. | |
| 2009/0323046 A1 | 12/2009 | Tan et al. | |
| 2016/0291134 A1 | 10/2016 | Droz et al. | |

FOREIGN PATENT DOCUMENTS

WO    2016097409    6/2016

OTHER PUBLICATIONS

Acamp, "Lidar Technology" presentation slides, Sep. 2016.

\* cited by examiner

*Primary Examiner* — Daniel L Murphy
(74) *Attorney, Agent, or Firm* — Bennett Jones LLP

(57) ABSTRACT

A lidar sensor system and method use the parallax phenomenon to determine one or more attributes of an object, such its distance, size, or shape. An optical element illuminates the object with a linear beam along a first plane. A photodetector is displaced from the optical element so that it detects the reflection of the linear beam from the object along a second plane, which is at an angle to the first plane. A computer-implemented line detection module determines a measure of deviation of the linear beam reflection from a vanishing point of the first plane. A computer-implemented analysis module determines the attribute based on the measure of deviation.

11 Claims, 3 Drawing Sheets

LIDAR SYSTEM FOR OBJECT DETECTION AND RECOGNITION

FIELD OF THE INVENTION

The present invention relates to a lidar sensor system for detecting and recognizing three-dimensional objects, which may be used, for example, to provide navigational data to an autonomous vehicle.

BACKGROUND OF THE INVENTION

Autonomous vehicles rely on various sensors to locate themselves on a map and to identify objects such as pedestrians, other vehicles, and barriers such as fences.

Radar and image sensors (cameras) are commonly used. However, radar does not provide any detailed information about objects detected, while cameras produce unmanageable volumes of data, and do not perform well in low-light or unusual light conditions.

Lidar is also commonly used to generate three-dimensional information about the vehicle's surroundings. A laser emitter spins in a housing and continually fires multiple beams of laser light, which ranges distant objects by time of return of the light reflection.

There is a need in the art for automated systems or methods for detecting and recognizing three-dimensional objects.

SUMMARY OF THE INVENTION

In general terms, a lidar sensor system of the present invention takes advantage of consistent properties of lasers and optics to create a measurement engine, which may be particularly useful for the automotive industry and specifically autonomous vehicles.

Therefore, in one embodiment, the invention may comprise a system for determining at least one attribute of an object, the system comprising:
  (a) a line generator comprising an optical element configured to produce a linear beam of detectable light along a first plane;
  (b) a photodetector tuned to detect a reflection of the linear beam from the object, the photodetector displaced from the optical element such that the photodetector detects the reflection along a second plane at an angle to the first plane;
  (c) a computer-implemented line detection module configured to determine at least one measure of deviation of the detected linear beam reflection from a vanishing point of the first plane; and
  (d) a computer-implemented analysis module configured to determine the at least one attribute of the object from the at least one measure of deviation.

In one embodiment of the system, the photodetector is a digital camera. In one embodiment, the first plane is substantially horizontal, the vanishing point is the horizon, and the photodetector is vertically displaced from the optical element. In one embodiment, the at least one attribute of the object comprises one or more of: a distance of the object from the system; a size of the object; a shape of the object; and an angular orientation of the object. In one embodiment, the line generator is configured to produce at least two linear beams, which may be produced on parallel planes, and using a diffraction grating. In one embodiment, the analysis module comprises a pattern recognition module to match an image of the linear beam reflection to a type of the object.

In another aspect, the invention comprises a method of determining at least one attribute of an object, the method comprising the steps of:
  (a) illuminating the object with a linear beam along a first plane;
  (b) detecting a reflection of the linear beam from the object along a second plane which is at an angle to the first plane; and
  (c) determining the at least one attribute of the object based on at least one measure of deviation of the detected linear beam reflection from a vanishing point of the first plane.

In one embodiment of the method, the first plane is substantially horizontal and the vanishing point is the horizon. The at least one attribute of the object may comprise one or more of: a distance of the object from an optical element that produces the linear beam; a size of the object; a shape of the object; and an angular orientation of the object.

In another aspect, the present invention comprises a tangible, non-transitory computer-readable medium storing a set of instructions readable by a computer processor to execute a method for determining at least one attribute of an object illuminated with a linear beam along a first plane, based on an image of a reflection of the linear beam from the object along a second plane which is at an angle to the first plane, the method comprising the steps of:
  (a) analyzing the image to determine at least one measure of deviation of the detected linear beam reflection from a vanishing point of the first plane; and
  (b) determining the at least one attribute from the at least one measure of deviation.

In one embodiment of the computer-readable medium, the at least one attribute of the object may comprise one or more of: a distance of the object from an optical element that produces the linear beam; a size of the object; a shape of the object; and an angular orientation of the object.

BRIEF DESCRIPTION OF THE DRAWINGS

In the drawings shown in the specification, like elements may be assigned like reference numerals. The drawings may not be to scale, with the emphasis instead placed upon the principles of the present invention. Additionally, each of the embodiments depicted are but one of a number of possible arrangements utilizing the fundamental concepts of the present invention.

DETAILED DESCRIPTION OF EMBODIMENTS OF THE INVENTION

The invention comprises a lidar sensor system which utilizes parallax to derive useful information about an object. The lidar sensor system may comprise an optical element to produce a linear beam of detectable light. In one example, the linear beam is aligned in a plane parallel to the horizon and the objects that it illuminates can be imaged. A camera or photodetector is positioned vertically displaced above or below the optical element. As a result, the image of the linear beam reflected by the object will be different for objects which are closer to the optical element than for objects which are farther away from the optical element, in accordance with the well-known phenomenon of parallax. The degree of apparent displacement correlates to the distance of the object.

Parallax is a displacement or difference in the apparent position of an object viewed along two different lines of sight, and is commonly used by most binocular animals intuitively to deduce the distance between them and the objects in their world. The principle relies on the existence of two similar but spatially separated points of view generated by each of two eyes. The distance between the eyes creates a shift between the foreground object and the details in the background as viewed by each eye.

In this description, the terms "horizontal" and "vertical" are used with the example of one embodiment where the system will create a linear beam which is emitted horizontally, i.e. on a plane substantially parallel to the horizon. Of course, the system may be used in different orientations, and the terms "horizontal" and "vertical" thus refer to the relative positions or orientations of the components described. For example, the system may be oriented such that the linear beam plane is vertical or tilted on a longitudinal axis intersecting the optical element and the vanishing point directly in front of the optical element. Alternatively, the system may be oriented such that the linear beam is tilted on a transverse axis, orthogonal to the longitudinal axis.

Figures 1A, 1B:
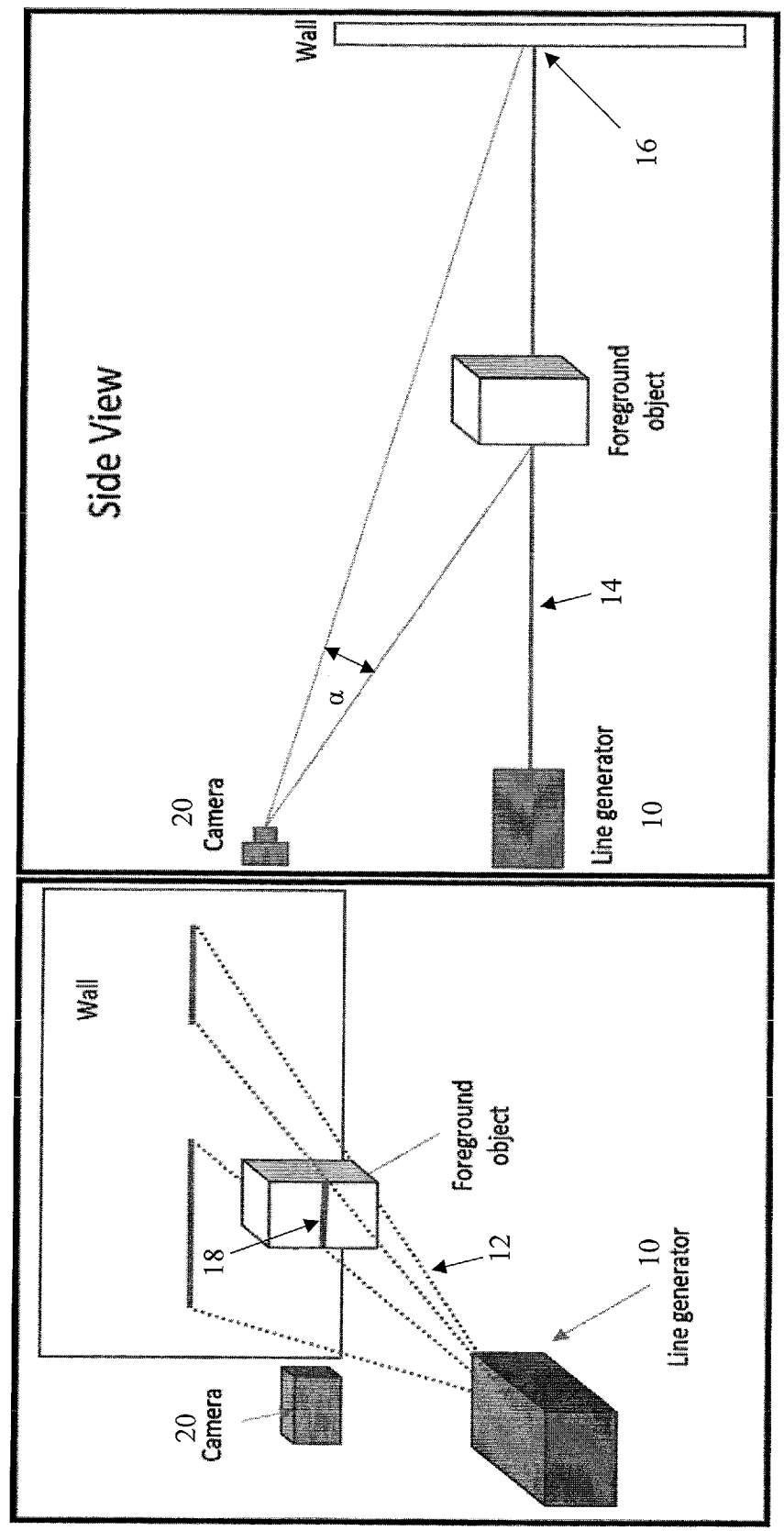
FIG. 1A shows a perspective view of a schematic representation of one embodiment of a lidar sensor system of the present invention, implementing a basic parallax method, in relation to a foreground object and a wall.
FIG. 1B shows a side view of the same system as shown in FIG. 1A.
Figure 3:
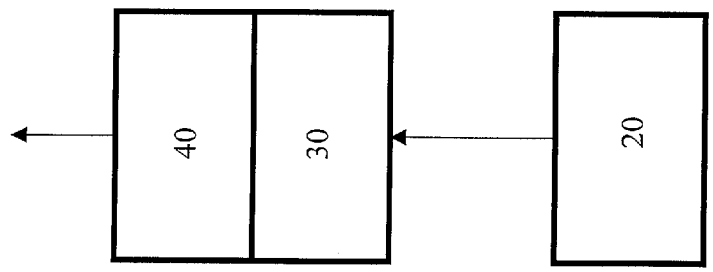
FIG. 3 shows a schematic representation of the photodetector, the line detection module and the analysis module of the system of FIG. 1A.

Referring to FIGS. 1A, 1B and 3, in one embodiment, the invention comprises a lidar sensor system comprising:
  (a) a line generator (10) comprising a laser light source and an optical element to produce a linear beam (12) from the laser light source and project the linear beam (12) along a horizontal plane (14), or at a known angle to the horizontal plane;
  (c) a photodetector (20) for detecting an image of the linear beam reflecting from an object intersected by the linear beam (12), which photodetector (20) is displaced vertically from the first optical element of the line generator (10);
  (d) a line detection module (30) for determining at least one measure of deviation (α) of the linear beam reflection (18) from a vanishing point (16) of the linear beam (12); and
  (e) an analysis module (40) for determining at least one attribute of the object, wherein the at least one attribute may comprise distance, shape, angular orientation and/or size of the object, based on the at least one measure of deviation (α).

The system may be mounted on a vehicle. Optionally, the system may further comprise a second optical element for producing a second linear beam or for splitting the beam into multiple linear beams, which are preferably parallel to each other.

The vanishing point (16) is a reference point for determining the degree of deflection or deviation (α) of the linear beam reflection (18). If the first plane is horizontal, it is the point which the linear beam (12) appears to merge with the horizon.

The laser light source may be any suitable laser emitter used in conventional lidar applications, which produces a light beam (12) which results in detectable reflections from objects of interest.

As used herein, a "photodetector" is a device which detects the reflected image of the linear beam (12) and converts into a signal. It may be a digital camera which captures an image in digital format.

As used herein, a "linear beam" is a beam of light which projects outwards on a plane, and intersects objects along a line, rather than a point. In other words, a transverse cross-section of the linear beam (12) is a line, preferably a straight line. As the linear beam (12) impinges on objects at varying distances, the reflection (18) of the beam as seen by a photodetector (20) which is above or below the plane of the linear beam (12) (the first plane) will be along a second plane which is at an angle to the first plane, and will appear displaced from the vanishing point (16) of the linear beam (12) along the first plane. The degree of displacement will increase, as the object gets closer to the photodetector (20). In other words, a larger angle between the first and second planes correlates to a larger apparent displacement between the image of the reflected linear beam (18) and the vanishing point (16) of the first plane.

In one embodiment, the optical element of the line generator (10) is a Powell lens, which is known to produce a linear beam (12) of a fixed angular extent and with reasonably uniform intensity across the length of the linear beam (12). Powell lenses use cylindrically shaped sections to focus light passing through it into a line parallel to the intersection of the surface of the lens and a plane tangent to the intersection. In some alternative embodiments, the optical element may produce a plurality of laser beams which fan outwards along the same plane, to approximate a linear beam (12).

Because it may readily be determined where a linear beam (12) along the first plane projects to its vanishing point (16), the apparent displacement of the linear beam (12) as it reflects off an object allows computation of the distance to the object.

Additionally, the appearance of the reflected linear beam (18) may provide shape and angular orientation information about the object. A flat surface which is orthogonal to the linear beam (12) will reflect the linear beam as a straight linear beam reflection (18), as seen in FIG. 1A, parallel to the linear beam (12). A flat surface which is angled away from the beam, as may be seen in the left-hand object (51) in FIG. 4A, will reflect the beam as a straight line, but non-parallel to the linear beam (12), as may be seen in the linear beam reflection off the left-hand object (51) in FIG. 4B. The apparent angle of the reflected line compared to the plane of the projected linear beam (12) and its length will also inform the system. A surface which is curved such that portions are closer or farther away from the emitter will reflect back a line which appears curved to the photodetector (20).

Figure 2:
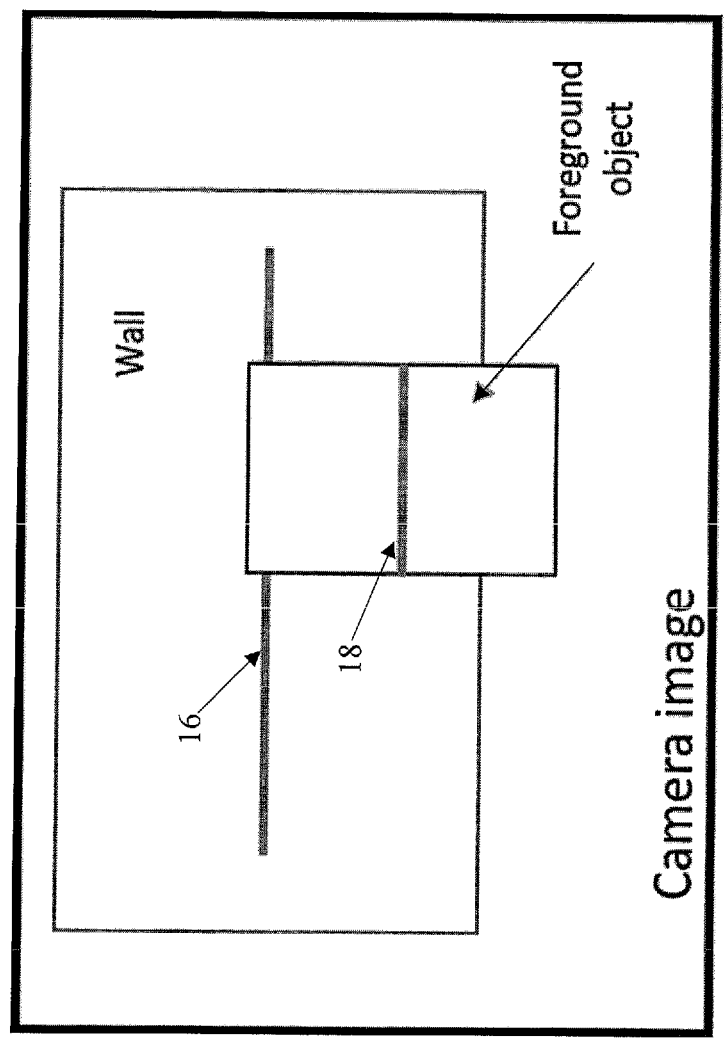
FIG. 2 shows a schematic representation of a camera image produced using the system of FIG. 1A.

In one embodiment, the line generator (10) creates a horizontal line across objects in the scene. In FIGS. 1A and 1B, the horizontal line is projected horizontally (parallel to the ground) to simplify the geometry for this description. FIG. 2 shows a camera image showing the parallax as seen by the photodetector (20) (a camera) displaced vertically above the optical element of the line generator (10). In the camera image, an object closer than the wall's position will exhibit a shift downwards away from the line as seen on the wall. This displacement is unique for an object at this particular distance and there exists an exact mapping of distance versus angular position (α). The analysis module (40) may determine distance with a lookup table, or by performing the calculation.

A line detection module (30) is operatively connected to the photodetector (20) (camera) to determine the position and/or shape of the line in the camera image. If the line image is a straight line and is parallel to the plane of the linear beam (12), then the apparent deviation of the line's position will be uniform along its length and may be calculated with respect to the line's calibrated position. If the line in the image is angled or curved, the system may determine the smallest deviation and the largest deviation of the line image. The difference between the smallest and largest deviations may be used to provide angle or shape information about the object. Alternatively, the system may measure the deviation at multiple points along the line image, and deduce object shape and angle from such multiple measurements.

The horizontal length of the reflected image provides size information of the object, relative to the distance of the object. In comparison with a smaller object at the same distance from the optical element of the line generator (10), a larger object will present a longer line image. In comparison with a surface orthogonal to the linear beam (12) and at the same distance from the optical element of the line generator (10), a surface angled away from the linear beam (12) will present a smaller line which will be at an angle. The line detection module (30) may therefore also calculate a horizontal dimension of the object as well as its distance from the system.

As shown in FIG. 3, the line detection module (30) may be integrated with or operatively connected to the photodetector (20), and the analysis module (40) where the desired information about the object may be determined from the reflected line image detected.

In another embodiment, a secondary optical element (not shown) may be provided to generate multiple linear beams, which are preferably parallel to each other. The secondary optical element may comprise a diffraction grating element. Alternatively, multiple laser beams and multiple linear beam generators stacked vertically may be used. The multiple linear beams, regardless of how they are generated, may be used to generate a point cloud with reasonable resolution.

Figures 4A, 4B:
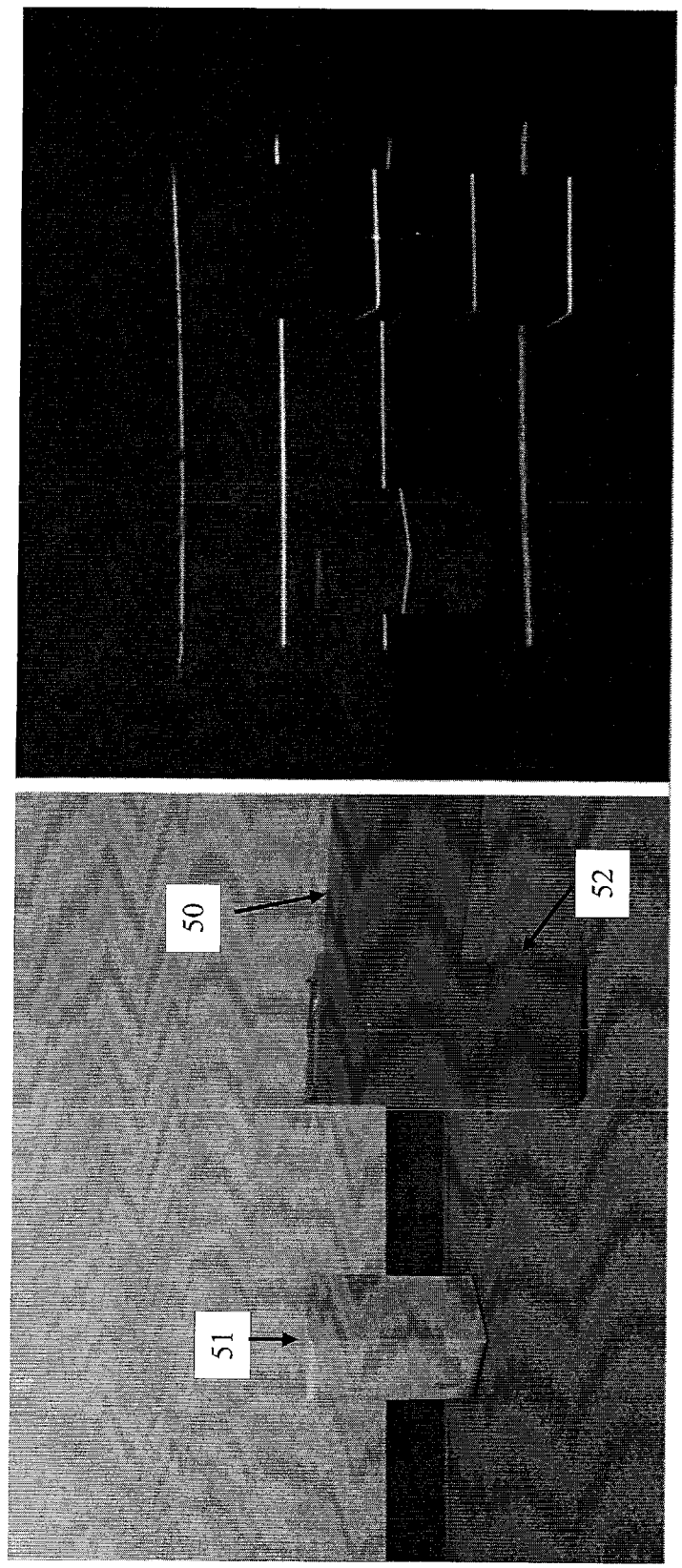
FIG. 4A shows a photograph of a test setup with a number of boxes at different distances and orientations.
FIG. 4B shows a photograph of multiple linear beams reflecting off the different boxes of FIG. 4A, produced using a system of the present invention.

FIGS. 4A and 4B shows photographs of a multi-beam test where four parallel and vertically spaced linear beams are reflected off of three objects: a distant vertical surface (50) orthogonal to the beams and parallel to a tangential plane; a distal box (51) presenting two planar surfaces at an angle to the beams; and a more proximate box (52) presenting a single planar surface parallel to the tangential plane. As seen in FIG. 4B, the far and near box objects (50, 52) displace the reflected linear beam images in the downward direction. In effect, each beam creates a distance profile of the objects that the beam encounters along the plane of projection.

A pattern recognition module may also be provided or integrated with the analysis module (40) to readily match the reflected beam images to commonly encountered objects, in order to identify the object's type with the system. As non-limiting examples, the identified object type may be a "pedestrian" or a "vehicle".

The line detection module (30), the analysis module (40) and/or the pattern recognition module may comprise a processor configured to perform the functions described herein. The processor comprises any suitable processor, or combination of processors, including but not limited to a microprocessor, a central processing unit (CPU) and the like. Other suitable processing units are within the scope of present implementations.

A "computer processor" or "processor" refers to an electronic device that is capable of processing an input electronic signal to produce an output electronic signal. In embodiments, a computer processor may include one or more devices commonly referred to as a programmable logic controller, a printed circuit board, an integrated circuit, a microcontroller, or the like. A "computing device" comprises at least one computer processor and typically includes a memory device comprising a non-transitory computer-readable memory for storing instructions executable by the processor.

"Non-transitory computer-readable memory" refers to a tangible medium capable of storing data and/or instructions in a format readable by a computer processor. In embodiments, a non-transitory computer-readable memory may include magnetic media, optical media, or solid-state media.

The at least one memory device can comprise any suitable memory device, including but not limited to any suitable one of, or combination of, volatile memory, non-volatile memory, random access memory (RAM), read-only memory (ROM), hard drive, optical drive, flash memory, magnetic computer storage devices (e.g. hard disks, floppy disks, and magnetic tape), optical discs, and the like. Other suitable memory devices are within the scope of present implementations.

Interpretation.

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Those skilled in the art will appreciate that in some implementations, the functionality of the described systems, and components, can be implemented using pre-programmed hardware or firmware elements (e.g., application specific integrated circuits (ASICs), electrically erasable programmable read-only memories (EEPROMs), etc.), or other related components. In other implementations, the functionality of the described systems, and components, can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or steps plus function elements in the claims appended to this specification are intended to include any structure, material, or act for performing the function in combination with other claimed elements as specifically claimed.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to connect such module, aspect, feature, structure, or characteristic with other embodiments, whether or not explicitly described. In other words, any module, element or feature may be combined with any other element or feature in different embodiments, unless there is an obvious or inherent incompatibility, or it is specifically excluded.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The singular forms "a," "an," and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

The term "about" can refer to a variation of ±5%, ±10%, +20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio.

The invention claimed is:

1. A system for determining at least one attribute of an object, the system comprising:
   (a) a line generator comprising an optical element configured to produce a linear beam of detectable light along a first plane;
   (b) a photodetector tuned to detect a reflection of the linear beam from the object, the photodetector displaced from the optical element such that the photodetector detects the reflection along a second plane at an angle to the first plane;
   (c) a computer-implemented line detection module configured to determine at least one measure of deviation of the detected linear beam reflection from a vanishing point of the first plane; and
   (d) a computer-implemented analysis module configured to determine the at least one attribute from the at least one measure of deviation.

2. The system of claim 1 wherein the photodetector is a digital camera.

3. The system of claim 1 wherein the at least one attribute comprises one or more of:
   (a) a distance of the object from the system, where the at least one measure of deviation is an angular measurement between the first plane and the second plane;
   (b) a size of the object, where the size is correlated to a length of the detected linear beam reflection;
   (c) a shape of the object, wherein the shape is correlated to a shape of the detected linear beam reflection; and
   (d) an angular orientation of the object, wherein the angular orientation is correlated to an angle between the detected linear beam reflection and the first plane.

4. The system of claim 1 wherein the first plane is substantially horizontal.

5. The system of claim 1 wherein the line generator is configured to produce at least two linear beams.

6. The system of claim 5 wherein the at least two linear beams are produced on parallel planes.

7. The system of claim 5 wherein the line generator comprises a diffraction grating to produce the at least two linear beams.

8. The system of claim 1 wherein the analysis module comprises a pattern recognition module to match an image of the linear beam reflection to a type of the object.

9. A method of determining at least one attribute of an object, the method comprising the steps of:
   (a) illuminating the object with a linear beam along a first plane;
   (b) detecting a reflection of the linear beam from the object along a second plane which is at an angle to the first plane; and
   (c) determining the at least one attribute of the object based on at least one measure of deviation of the detected linear beam reflection from a vanishing point of the first plane.

10. The method of claim 9 wherein the at least one attribute comprises one or more of:
   (a) a distance of the object from an optical element that produces the linear beam, where at least one measure of deviation is an angular measurement between the first plane and the second plane;
   (b) a size of the object, where the size is correlated to a length of the detected linear beam reflection;
   (c) a shape of the object, wherein the shape is correlated to a shape of the detected linear beam reflection; and
   (d) an angular orientation of the object, wherein the angular orientation is correlated to an angle between the detected linear beam reflection and the first plane.

11. The method of claim 9 wherein the first plane is substantially horizontal.

\* \* \* \* \*